United States Patent [19]

Grimminger et al.

[11] 4,354,814

[45] Oct. 19, 1982

[54] EXTRUDER WITH A SHEET EXTRUSION HEAD AND AN ASSOCIATED CALENDER

[75] Inventors: Albert Grimminger, Warmbronn; Heinz Koch, Ludwigsburg, both of Fed. Rep. of Germany

[73] Assignee: Werner and Pfleiderer, Stuttgart, Fed. Rep. of Germany

[21] Appl. No.: 184,340

[22] Filed: Aug. 5, 1980

[30] Foreign Application Priority Data

Sep. 14, 1979 [DE] Fed. Rep. of Germany ....... 2937204

[51] Int. Cl.³ .................... B29F 3/012; B29F 3/04
[52] U.S. Cl. ................................ 425/186; 425/188; 425/190; 425/192 R; 425/194; 425/325; 425/367; 425/376 B; 425/DIG. 235
[58] Field of Search ........... 425/325, 327, 367, 376 B, 425/186, 188, 190, 192 R, 194, DIG. 235

[56] References Cited

U.S. PATENT DOCUMENTS

| | | | |
|---|---|---|---|
| 3,408,694 | 11/1968 | Matsuoka | 425/186 |
| 3,482,279 | 12/1969 | Anders et al. | 425/192 R |
| 3,488,807 | 1/1970 | Vossen | 425/192 R |
| 3,535,738 | 10/1970 | Vossen | 425/192 R |
| 3,694,120 | 9/1972 | Walton | 425/327 |
| 3,756,757 | 9/1973 | Grundmann | 425/192 R |
| 3,895,898 | 7/1975 | Theysohn | 425/327 |
| 3,902,835 | 9/1975 | Theysohn | 425/192 R |
| 3,988,097 | 10/1976 | Anders et al. | 425/192 R |
| 4,028,035 | 6/1977 | Komarek | 425/367 |
| 4,127,373 | 11/1978 | Anders et al. | 425/327 |

FOREIGN PATENT DOCUMENTS

| | | |
|---|---|---|
| 2229828 | 1/1974 | Fed. Rep. of Germany . |
| 2413844 | 1/1976 | Fed. Rep. of Germany . |
| 998725 | 7/1965 | United Kingdom . |

*Primary Examiner*—Jeffery R. Thurlow
*Attorney, Agent, or Firm*—Browdy and Neimark

[57] ABSTRACT

In an extruder with a wide extrusion head and an associated calender, the wide extrusion head defining a sheet extrusion die 16 has an upper extrusion head, part 12 and a lower extrusion head part, which parts can be moved away from one another. At least one clamping device is provided which releasably presses the upper extrusion head part and the lower extrusion head part together and which is mounted in an associated side wall of the calender and is provided with a hydraulically operable piston cylinder drive. In order to achieve optimum clamping of the upper extrusion head part 12 and the lower extrusion head part, each clamping device has a tie rod which, on its one side bears against the lower extrusion head part or the upper extrusion part by means of a fixed abutment, e.g. a nut, or by means of an axially variable abutment e.g. a thrust box 51, which can be driven by a drive nut, the clamping device being mounted on the side wall to be freely movable in the upward and horizontal directions.

7 Claims, 5 Drawing Figures

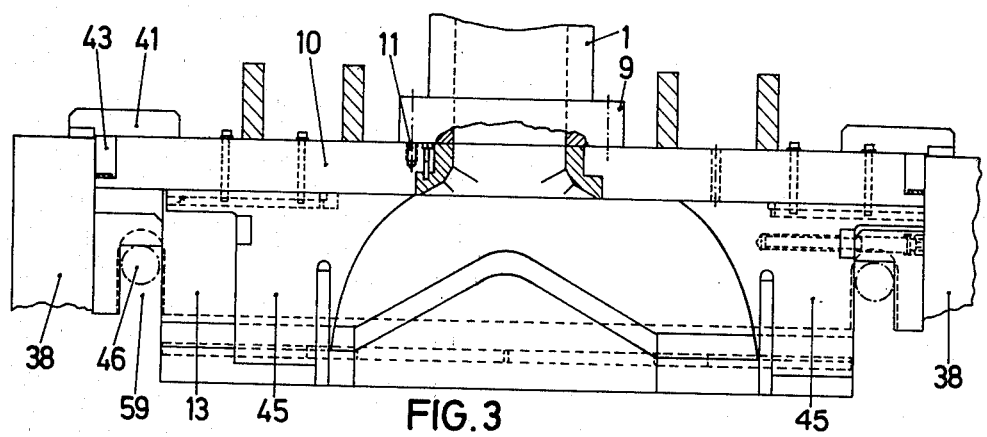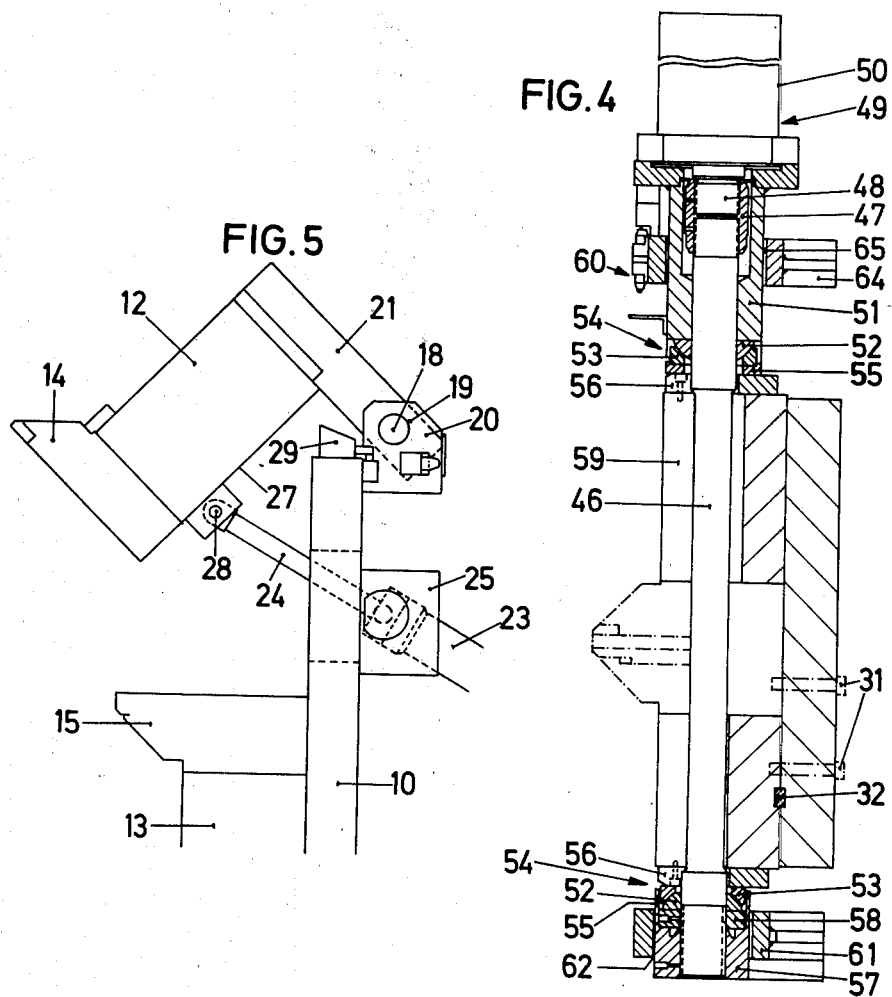

EXTRUDER WITH A SHEET EXTRUSION HEAD AND AN ASSOCIATED CALENDER

FIELD OF INVENTION

The invention relates to an extruding apparatus with a wide extrusion head and an associated calender.

BACKGROUND OF INVENTION

The combination of an extruder with a wide extrusion head and a calender is known from German Offenlegungsschrift No. 2,229,828. So-called roller head units of this type are used to form wide webs of material which has been plasticized by the extruder, in particular rubber mixes which emerge in the form of an already wide pattern from the wide extrusion head and are then calendered in the roll nip of the calender into sheets or layers of exactly determined thickness. In order to permit cleaning of the sheet extrusion die of this known machine, the wide extrusion head is divided into an upper extrusion head part and a lower extrusion head part. The upper extrusion head part is joined to the extruder housing, while the lower extrusion head part is mounted in a fixed position on the side walls of the calender frame.

Clamping devices are fitted to the side walls of the calender frame, which clamping devices comprise a hydraulically operable piston cylinder drive, the free end of the particular piston rod being capable of being pressed against the upper side of the upper extrusion head part while the latter is in the working position, whereby the upper extrusion head part and the lower extrusion head part are pressed together. The considerable forces arising during operation and effecting an expansion of the sheet extrusion die are absorbed by the side walls of the calender frame in this known design. This design is disadvantageous because the large forces introduced in this way into the side walls of the calender frame make a fine adjustment of the roll nip between the calender rolls very difficult. Moreover, the side walls of the calender frame are exposed to extremely high loadings. It is very costly to size the calender frame in such a way that these drawbacks are overcome.

It is known from German Auslegeschrift No. 2,413,844 to construct a wide extrusion head for extruders from an upper extrusion head part and a lower extrusion head part, which parts can be tilted away from one another in order to facilitate cleaning.

From British Pat. No. 998,725, an extruder having a wide extrusion head with a calender is generally known.

SUMMARY OF INVENTION

It is an object of the present invention to provide an extruder with a wide extrusion head and an associated calender in such a way that optimum clamping of the upper extrusion head part and lower extrusion head part is achieved. Another object is to overcome deficiencies in the prior art, such as noted above. A further object is to facilitate the formation of wide plasticized webs of plastomeric and elastomeric materials.

According to the invention, such objects are achieved by the use of clamping means including releasable tie rods. The result of the measures according to the invention is that the forces effecting an expansion of the sheet extrusion die from the inside are not indirectly compensated via the side walls of the calender, but are compensated directly via tie rods. As a result of this construction, tensile and bending forces do not arise in the calender frame. Moreover, there need be no fear of adversely affecting the accuracy of adjustment of the roll nip between the calender rolls. Constructionally, the clamping devices are virtually completely separate from the extruder on the one hand and the calender on the other hand; they are mounted on the calender frame merely in such a way that, when the wide extrusion head of the extruder is moved out, they remain in a position which enables the wide extrusion head to be returned again. In other respects, however, the clamping devices are freely adjustable relative to the sheet extrusion head. A further result is that the extrusion head components can expand in all directions so that, when there is a temperature change in the heating medium or in the material being extruded, no additional forces are introduced into the clamping device and into the calender frame.

The use of spherical bearings with the tie rods ensure that no bending forces whatsoever can pass into the clamping devices. Moreover, the thrust loading in the wide extrusion head and the tensile loading in the tie rods are always made completely uniform over the cross sections, that is to say the specific loadings are minimized.

The provision of bearing supports for the spherical bearings ensures that the spherical bearings are held together.

In order to make the directions of forces in the upper extrusion head part and in the lower extrusion head part as central as possible on the one hand and, on the other hand, nevertheless enable the extruder with the wide extrusion head to be moved easily away from or towards the calender, the tie rods are located in recesses which open toward the calender.

A particularly simple, self-adjusting clamping of the parts of the wide extrusion head is achievable by means enabling the upper and lower head parts to be placed loosely against one another. Means to tilt the upper head part upwardly relative to the lower head part has the result that, on the one hand, the self-adjusting clamping of the parts of the wide extrusion head by means of the clamping devices is promoted, but that, on the other hand, a particularly easy accessibility of the sheet extrusion die in the open state for cleaning purposes is ensured. The provision of releasable head inserts serves to increase the usefulness of the extrusion head.

BRIEF DESCRIPTION OF DRAWING

Further advantages and features of the invention can be seen from the description of an illustrative embodiment of the invention by reference to the drawing in which

FIG. 3 shows a section through FIG. 2 along line III—III;

FIG. 4 shows a section through a clamping device along line IV—IV in FIG. 2, and FIG. 5 shows a partial section through FIG. 2 along line V—V, with the upper extrusion head part tilted upwards.

DETAILED DESCRIPTION OF EMBODIMENT

Figure 1:
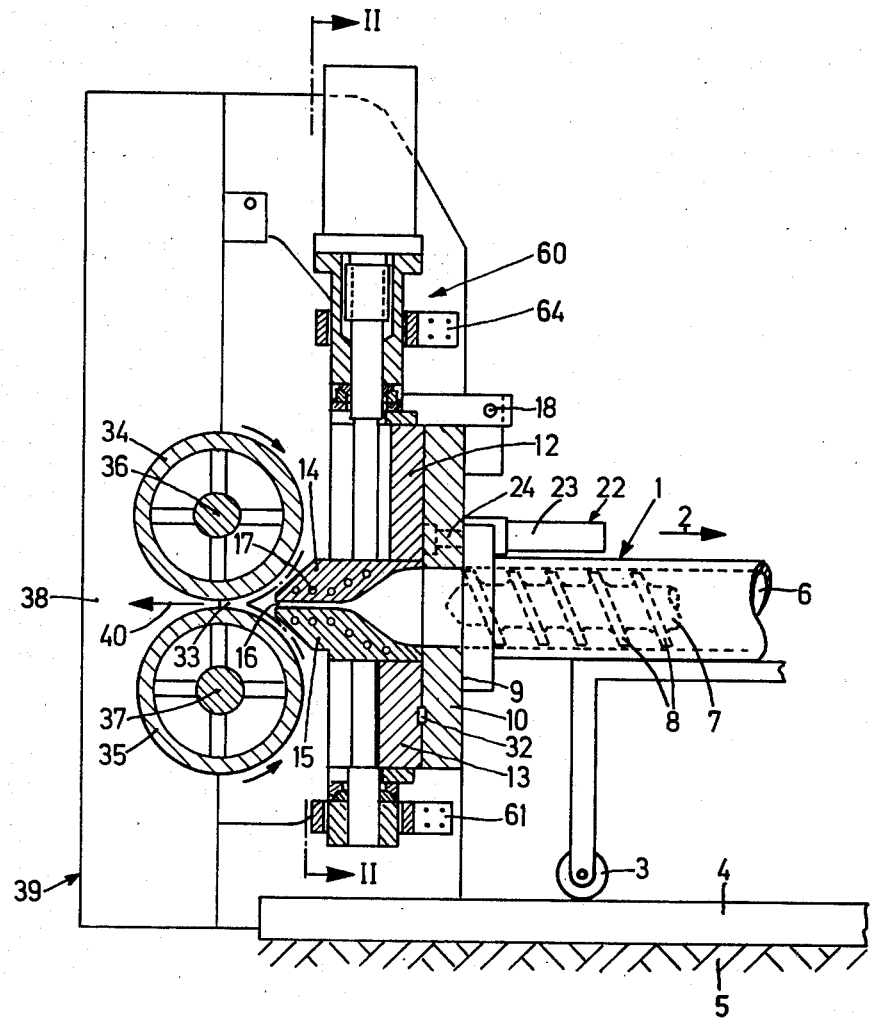
FIG. 1 shows a vertical side view of a part of an extruder with a wide extrusion head and an associated calender, including clamping devices, in a partially detailed representation.

An extruder, of which only the housing end 1 is indicated in FIG. 1, can be moved in its longitudinal direction from a working position indicated in FIG. 1 into a rest position in the direction of the arrow 2. For this purpose, the extruder is supported by means of rollers 3 for travel on rails 4 which are in a fixed position relative to the floor 5.

In a barrel bore 6, the extruder has a screw shaft 7 which is provided with screw thread flights 8. This screw shaft 7 with screw thread flights 8 can be rotationally driven in the customary manner not shown in the drawing. The extruder can be a so-called cold feed extruder, to which the material to be treated, for example, rubber mixes, is fed cold and then, while it is conveyed through the barrel bore 6 by means of the screw shaft 7 with screw thread flights 8, is plasticized by kneading and shearing, for which purpose external heat can also be supplied if necessary. Extruders of this type are generally known. In the present illustrative embodiment, this is a single-screw extruder, although it will be understood that plural screw extruders can also be used.

A carrier plate 10 is attached by means of bolts 11 (see FIG. 3) to the outer front face 9 of the housing end 1. On this carrier plate 10, a wide extrusion head is fitted, which consists of an upper extrusion head part 12 and a lower extrusion head part 13, on each of which mutually associated, exchangeable extrusion head inserts 14 and 15 are mounted. These extrusion head inserts 14, 15 define a sheet extrusion die 16, through which material which has been plasticized in the extruder is forced out due to the conveying action of the screw 7, 8. Channels 17 for a heating medium are provided in the extrusion head inserts 14, 15.

The upper extrusion head part 12 can be tilted upwards, relative to the carrier plate 10, about a tilt axis 18 associated with its upper side. This tilt axis 18 is formed by hinges 19, one hinge part 20 of which is mounted on the carrier plate 10, while its respective other hinge part 21 is fixed to the upper side of the upper extrusion head part 12.

Figure 2:
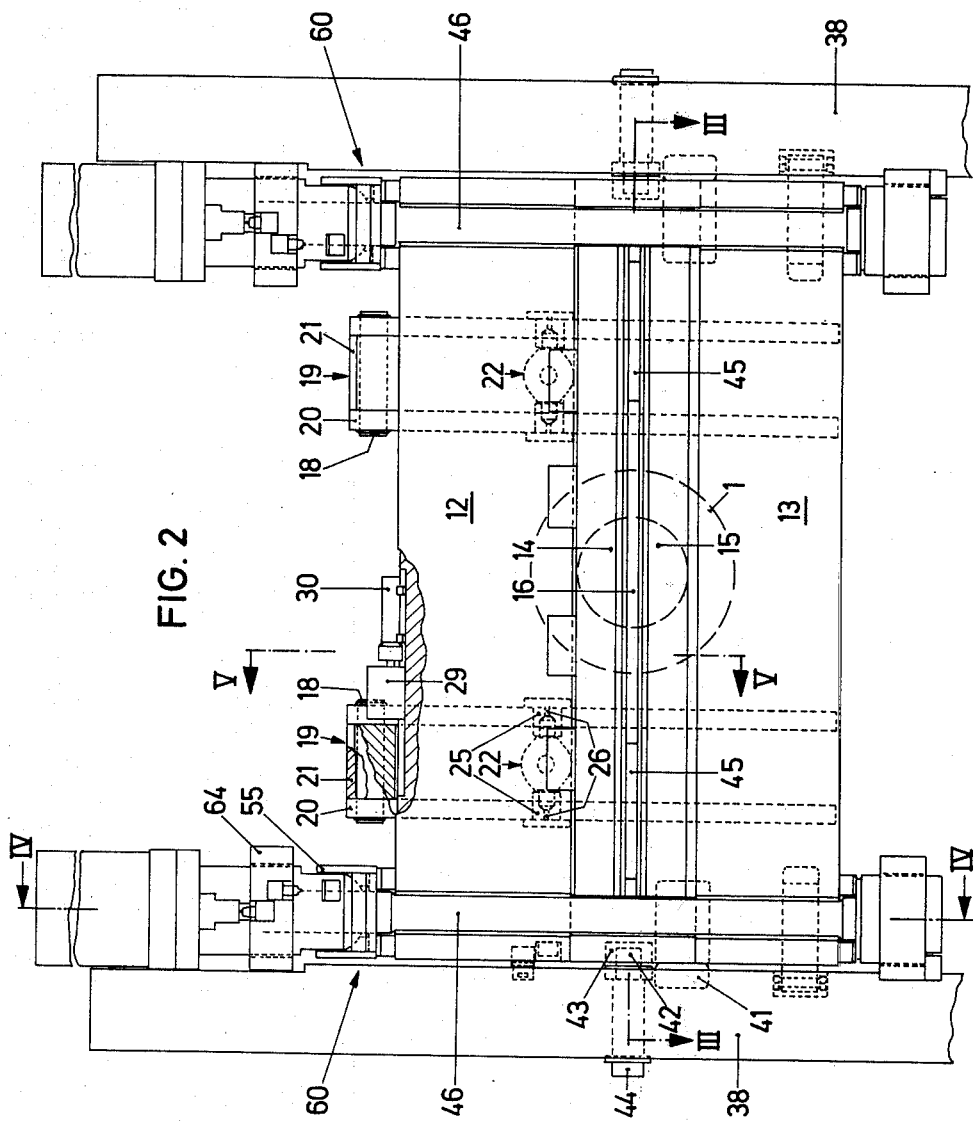
FIG. 2 shows a front view of the extruder with a wide extrusion head and clamping devices, along line II—II in FIG. 1.

Tilting drive units 22 each consisting of a hydraulically operable piston 24 and cylinder arrangement (see FIGS. 1, 2 and 5) are fitted below the hinges 19 on that side of the carrier plate 10 which faces the housing end 1. At the end adjacent to the exit of its piston rod 24, the cylinder 23 is pivotably mounted in bearing blocks 25 by means of pivot journals 26. These pivot journals 26 are arranged parallel to the tilt axis 18 of the hinges 19. In the zone of its free end, the piston rod 24 is joined to the rear 27 of the upper extrusion head part 12 in its lower part, facing the carrier plate 10, and specifically by means of a pivot joint 28, the axis of which is in turn arranged parallel to the tilt axis 18 and to the axis of the pivot journals 26. This design makes it possible to tilt upwards the upper extrusion head part 12, together with the upper extrusion head insert 14 fitted thereto, so that the sheet extrusion die 16 is opened. To secure the upper extrusion head part 12 in this tilted-up position, a safety wedge 29 (see FIGS. 2 and 5) is provided on the upper side of the carrier plate 10, which wedge can be moved underneath the tilted-up hinge part 21 of the hinge 19 by means of a hydraulically operable piston and cylinder drive unit 30.

Noting FIG. 4 it is seen that the lower extrusion head part 13 is bolted firmly to the carrier plate 10 by means of bolts 31, vertical adjustment, i.e. adjustment relative to the upper extrusion head part 12, being effected by means of a groove and fitting key arrangement 32.

In its working position, shown in FIG. 1, the extruder is positioned so that the sheet extrusion die 16 projects well into the roll nip 33 of the pair of calender rolls 34, 35 which are each mounted in the side walls 38 of a calender frame 39 so they can be rotated about their axes 36, 37. The rolls are driven in opposite directions so that, in the region of the exit from the sheet extrusion die 16, the direction of revolution of the two calender rolls 34, 35 corresponds to the exit direction 40 of the material from the sheet extrusion die 16 into the roll nip 33. This material emerging from the sheet extrusion die 16 is calendered between the calender rolls 34, 35 to form a sheet or web.

In this working position of the extruder, the carrier plate 10 is axially fixed opposite a side wall 38 of the calender frame 39 by means of a stop plate 41 fitted to the carrier plate 10. Moreover, the carrier plate 10 is locked in this position by means of a bolt 42 which engages in a corresponding recess 43 in the carrier plate 10. The bolt 42 itself is mounted on the associated side wall 38 of the calender frame 39 and it is moved into or out of a locking position by means of a hydraulically operable piston and cylinder drive unit 44. In this locking position, the sheet extrusion head with the sheet extrusion die 16 is fixed in the desired position relative to the roll nip 33 of the pair of calender rolls 34, 35.

A pair of jaws 45 located between the extrusion head inserts 14 and 15, guide the material and laterally define the sheet extrusion die 16. These jaws 45 which guide the material are laterally adjustably screwed to the carrier plate 10. At the same time the upper and lower surfaces, respectively, of the extrusion head inserts 14, 15 bear against the guide jaws 45. Various lateral positions are shown in FIG. 3.

Two tie rods 46 are provided for clamping together the upper extrusion head part 12 and the lower extrusion head part 13, with the respective extrusion head insert 14 and 15 fitted thereto, in the working position shown in FIG. 1. The upper ends of these tie rods 46 are each joined by means of a threaded sleeve 47 to a piston rod 48 of a piston and cylinder drive unit 49. To generate the necessary forces, this drive unit 49 can be constructed as a so-called tandem drive. The cylinder 50 of the drive unit 49 is supported via a tubular thrust box 51, which surrounds the threaded sleeve 47 and is circular-cylindrical on the outside, on a spherical bearing body 52. The bearing body 52 in turn is seated in a corresponding bearing cup 53. The bearing 54, formed from the bearing body 52 and the bearing cup 53, is held to the thrust box 51 by means of a bearing support 55. Associated therewith, thrust plates 56 are bolted to the upper side of the upper extrusion head part 12, the bearing 54 being in contact with the thrust plates 56 in the working position shown in FIG. 1.

A tie rod nut 57, secured by a counter-nut 58, is screwed onto the lower end of each tie rod 46. A spherical bearing body 52 associated with a corresponding bearing cup 53 is in turn seated on this counter-nut 58. When the extruder is in the working position, this bearing cup 53 is in contact with the thrust plate 56 bolted to the underside of the lower extrusion head part 13. In this position, the tie rods 46 are located in recesses 59 which are open towards the calender rolls 34, 35, so that the extruder with the wide extrusion head can be moved away in the direction of the arrow 2.

The entire clamping device 60 which has been described and which essentially consists of the drive unit 49, tie rods 46 and bearings 54, is fitted, to be movable axially upwards, to the respective side wall 38 of the calender frame 39. For this purpose, a butt strap 61 is bolted in each case to the respective side wall 38, the butt strap 61 having a bore 62 of a diameter larger than that of the external diameter of the tie rod nut 57, so that the nut 57 is located in the bore 62 with radial play. A stop 63 which partially extends underneath the bore 62 is fitted to the underside of the butt strap 61, so that the tie rod 46 is fixed in the downward direction, while it is axially freely movable upwards.

In the upper area, the clamping device 60 is guided by an arrangement in which a further butt strap 64 is bolted to the corresponding side wall 38 of the calender frame 39, which butt strap 64 has a bore 65 which is in alignment with the bore 62 and through which the thrust box 51 passes and which likewise has a larger diameter than the thrust box 51, so that the thrust box 51 is located with radial play in the bore 65.

To clamp the upper extrusion head part 12 with the extrusion head insert 14 to the lower extrusion head part 13 with the corresponding extrusion head insert 15, hydraulic fluid is admitted to the drive unit 49 in such a way that the cylinder 50 is moved downwards and the upper extrusion head part 12 and lower extrusion head part 13 are thus forced together between the two spherical bearings 54.

Since the bearings 54 are designed as spherical ball-and-socket joints and since the clamping device 60 is guided with radial play in the butt straps 61 and 64, clamping can be effected in such a way that only pure tensile forces or thrust forces, and no bending forces or buckling forces, are exerted on the tie rod 46 on the one hand and, on the other hand, on the upper extrusion head part 12 and lower extrusion head part 13 and the associated extrusion head inserts 14, 15.

To enable the extruder with the sheet extrusion head to be moved away from the calender rolls 34, 35, the pressure loading of the drive unit 49 is reversed so that the cylinder 50 with the thrust box 51 and the upper bearing 54 with the bearing support 55 is moved slightly away upwards. Subsequently, after the bolt 42 has been released by the drive unit 44, the extruder with the wide extrusion head can be moved away corresponding to the direction of the arrow 2. In this moved-away position, the upper extrusion head part 12 with the associated extrusion head insert can then be tilted up by means of the tilting drive 22, whereby the sheet extrusion ejector die 16 is opened. In this position, the latter can be cleaned.

The foregoing description of the specific embodiments will so fully reveal the general nature of the invention that others can, by applying current knowledge, readily modify and/or adapt for various applications such specific embodiments without departing from the generic concept, and, therefore such adaptations and modifications should and are intended to be comprehended within the meaning and range of equivalents of the disclosed embodiments. It is to be understood that the phraseology or terminology employed herein is for the purpose of description and not of limitation.

What is claimed is:

1. An extruder with a wide extrusion head defining an elongated die for forming a sheet and an associated calender mounted in a frame, comprising an extruder housing movable into working position adjacent to said calender and into a position remote from said calender wherein the wide extrusion head, defining a sheet extrusion die, has an upper extrusion head part and a lower extrusion head part, means to separate the upper head part from the lower head part; clamping means to releasably press the upper extrusion head part and the lower extrusion head part together and which is mounted in an associated side wall of the calender and is provided with a hydraulically operable piston and cylinder drive unit, said clamping means comprising a tie rod, which releasably bears against the lower extrusion head part or against the upper extrusion head part by means of either a fixed abutment or by means of an axially variable abutment to vary the axial position of said axially variable abutment, and wherein said clamping means remains mounted on a side wall of said calender frame but is freely swingingly movable in the upward and horizontal directions.

2. Extruder according to claim 1, wherein a spherical bearing is provided between each of said abutments and the upper extrusion head part and the lower extrusion head part respectively.

3. Extruder according to claim 2, wherein a bearing support is provided between at least one said bearing and the associated extrusion head part.

4. Extruder according to claim 1, wherein each said tie rod is located in recesses which open towards the calender, in the upper extrusion head part and in the lower extrusion head part.

5. Extruder according to claim 1, wherein the upper extrusion head part and the lower extrusion head part can be placed loosely against each other.

6. Extruder according to any one of claims 1 to 4, further comprising means to tilt upwardly the upper extrusion head part relative to the lower head part.

7. Extruder according to claim 1, wherein the upper extrusion head part and the lower extrusion head part are each releasably associated with extrusion head inserts.

* * * * *